US007800929B2

(12) United States Patent
Yamamoto et al.

(10) Patent No.: US 7,800,929 B2
(45) Date of Patent: Sep. 21, 2010

(54) CONTROL METHOD FOR PWM CYCLO-CONVERTER BY SELECTIVELY TURNING ON A TWO-WAY SEMICONDUCTOR SWITCH AND CONTROLLER

(75) Inventors: Eiji Yamamoto, Fukuoka (JP); Hidenori Hara, Fukuoka (JP); Jun-Koo Kang, Fukuoka (JP)

(73) Assignee: Kabushiki Kaisha Yaskawa Denki, Furkuoka (JP)

( * ) Notice: Subject to any disclaimer, the term of this patent is extended or adjusted under 35 U.S.C. 154(b) by 748 days.

(21) Appl. No.: 11/547,389

(22) PCT Filed: Mar. 25, 2005

(86) PCT No.: PCT/JP2005/005509

§ 371 (c)(1),
(2), (4) Date: Jan. 18, 2007

(87) PCT Pub. No.: WO2005/099075

PCT Pub. Date: Oct. 20, 2005

(65) Prior Publication Data
US 2008/0291698 A1    Nov. 27, 2008

(30) Foreign Application Priority Data
Mar. 31, 2004    (JP)    ............... 2004-104598

(51) Int. Cl.
*H02M 5/275*    (2006.01)
(52) U.S. Cl. .................. 363/163; 363/157; 363/159; 363/165
(58) Field of Classification Search ............... 363/157, 363/159, 163, 165; 327/175; 332/106
See application file for complete search history.

(56) References Cited

U.S. PATENT DOCUMENTS

2009/0091954 A1*    4/2009   Yamanaka .................... 363/34

FOREIGN PATENT DOCUMENTS

JP    11-18489 A    1/1999

(Continued)

OTHER PUBLICATIONS

English Machine Translation of JP11-018489 A, Jan. 22, 1999.*

(Continued)

*Primary Examiner*—Edward Tso
*Assistant Examiner*—Manuel Hernandez
(74) *Attorney, Agent, or Firm*—Sughrue Mion, PLLC

(57) ABSTRACT

A control method for a PWM cyclo-converter is provided in which a voltage can be accurately generated even when a voltage command is small.

In the PWM cyclo-converter, the turning on and off operations of two-way semiconductor switch are repeated at intervals of short time. As switching patterns, within the intervals of short time, a first terminal of output side terminals outputs in order a maximum potential phase P, an intermediate potential phase M and the maximum potential phase N, a second terminal of the output side terminals outputs in order the maximum potential phase P, the intermediate potential phase M, a minimum potential phase N, the intermediate potential phase M and the maximum potential phase P, and a third terminal of the output side terminals outputs in order the intermediate potential phase M, the minimum potential phase N and the intermediate potential phase M.

13 Claims, 9 Drawing Sheets

FOREIGN PATENT DOCUMENTS

| | | |
|---|---|---|
| JP | 11-341807 A | 12/1999 |
| JP | 2001-86751 A | 3/2001 |
| JP | 2001-145398 A | 5/2001 |
| JP | 2003-259647 A | 9/2003 |

OTHER PUBLICATIONS

English Machine Translation of JP2003-259647 A, Sep. 12, 2003.*
English Machine Translation of JP2001-086751 A, Mar. 30, 2001.*
Japanese Office Action dated Oct. 7, 2008.

* cited by examiner

INPUT PHASE:

OUTPUT PHASE:

FIG. 5

| OUTPUT PHASE | SECTION | UR, US, UT | VR, VS, VT | WR, WS, WT |
|---|---|---|---|---|
| | | Vmax | Vmid | Vmin |
| SECTION : 0<br>0 TO 60 DEGREE<br>Vmax = Vu<br>Vmid = Vv<br>Vmin = Vw | a | 010 | 001 | 001 |
| | b | 010 | 010 | 001 |
| | c | 010 | 010 | 010 |
| | d | 100 | 010 | 010 |
| | e | 100 | 100 | 010 |

FIG. 6

| OUTPUT PHASE | SECTION | UR, US, UT | VR, VS, VT | WR, WS, WT |
|---|---|---|---|---|
| | | Vmax | Vmid | Vmin |
| SECTION : 0<br>0 TO 60 DEGREE<br>Vmax = Vu<br>Vmid = Vv<br>Vmin = Vw | a | 100 | 100 | 010 |
| | b | 100 | 010 | 010 |
| | c | 010 | 010 | 010 |
| | d | 010 | 010 | 001 |
| | e | 010 | 001 | 001 |

FIG. 7(a)
FIG. 7(b)
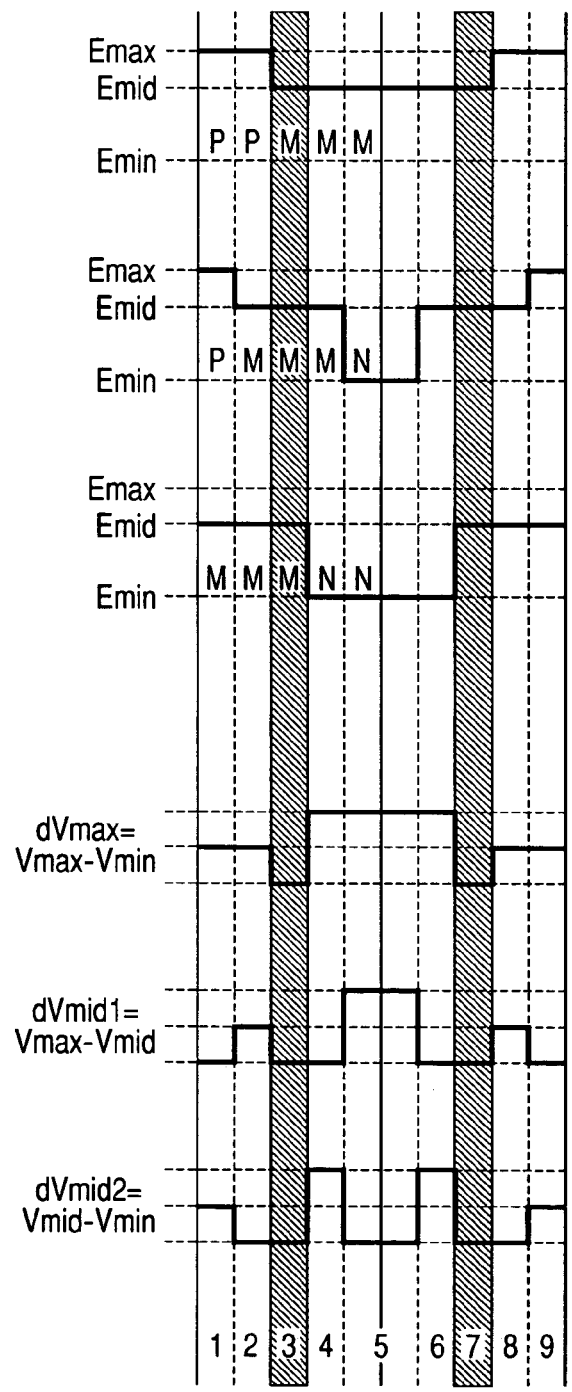
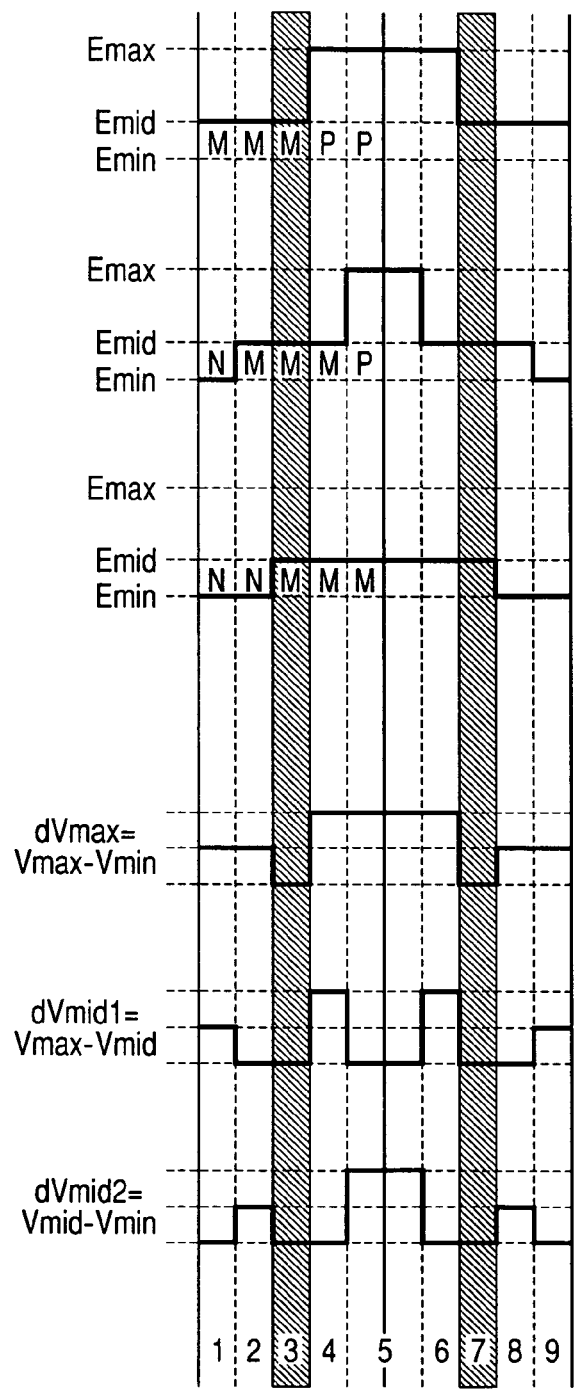

FIG. 8(a)
FIG. 8(b)
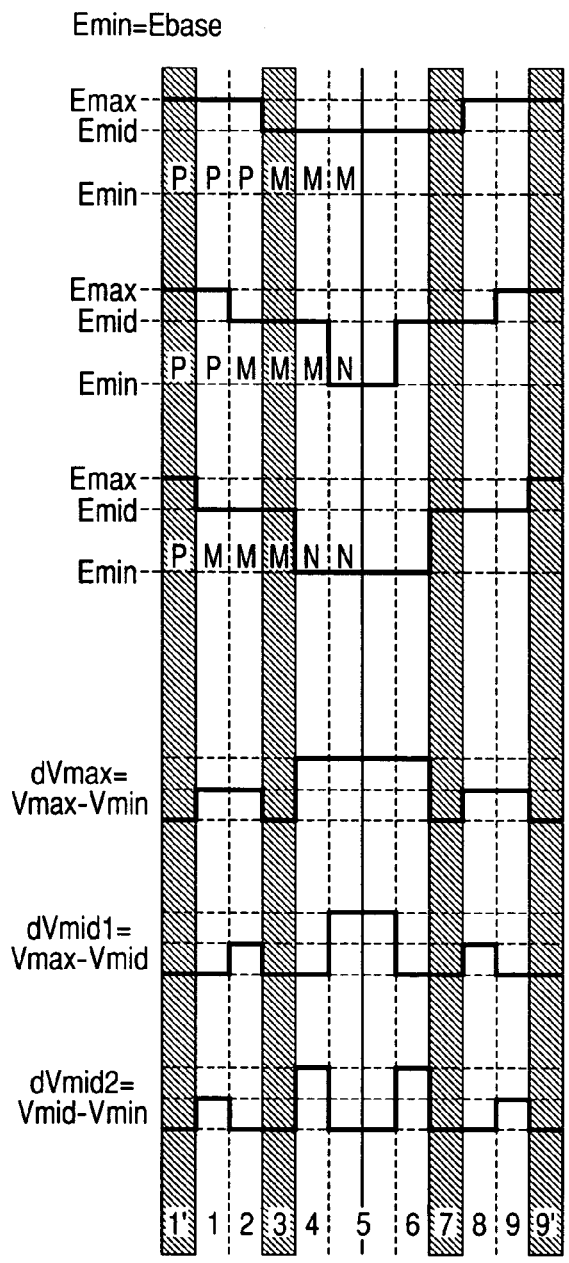
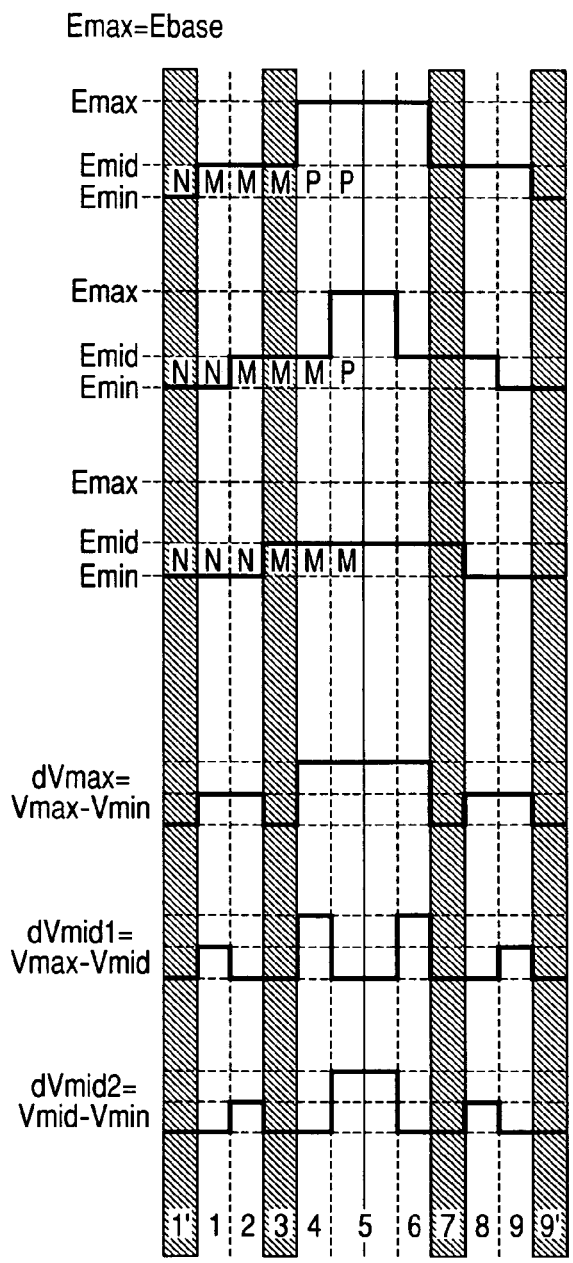
ZERO VECTOR

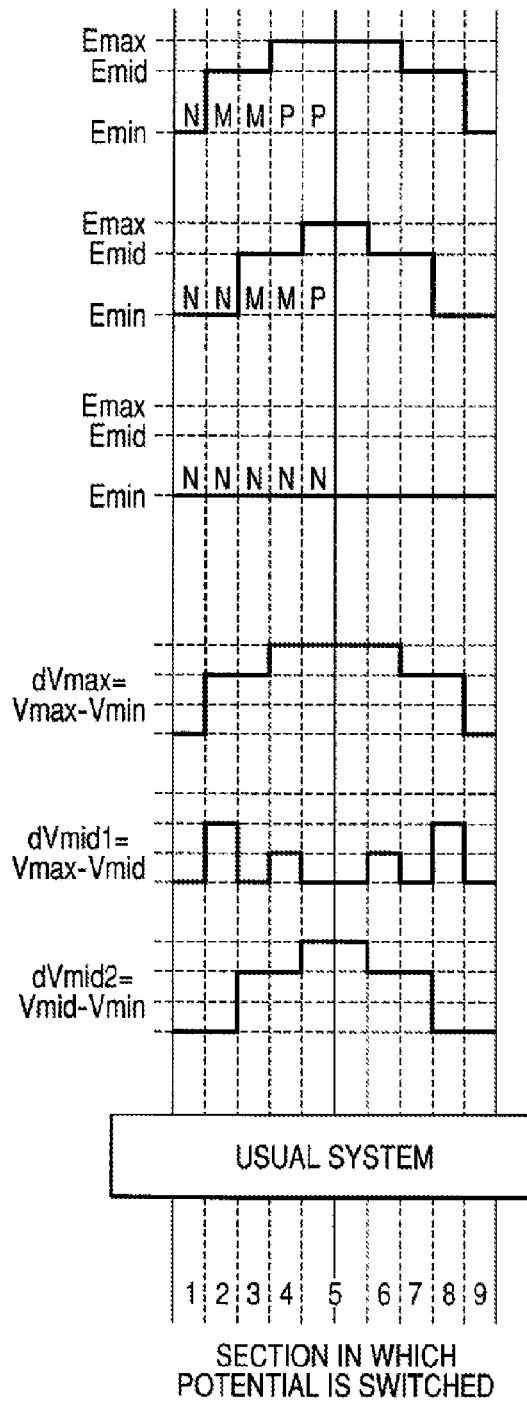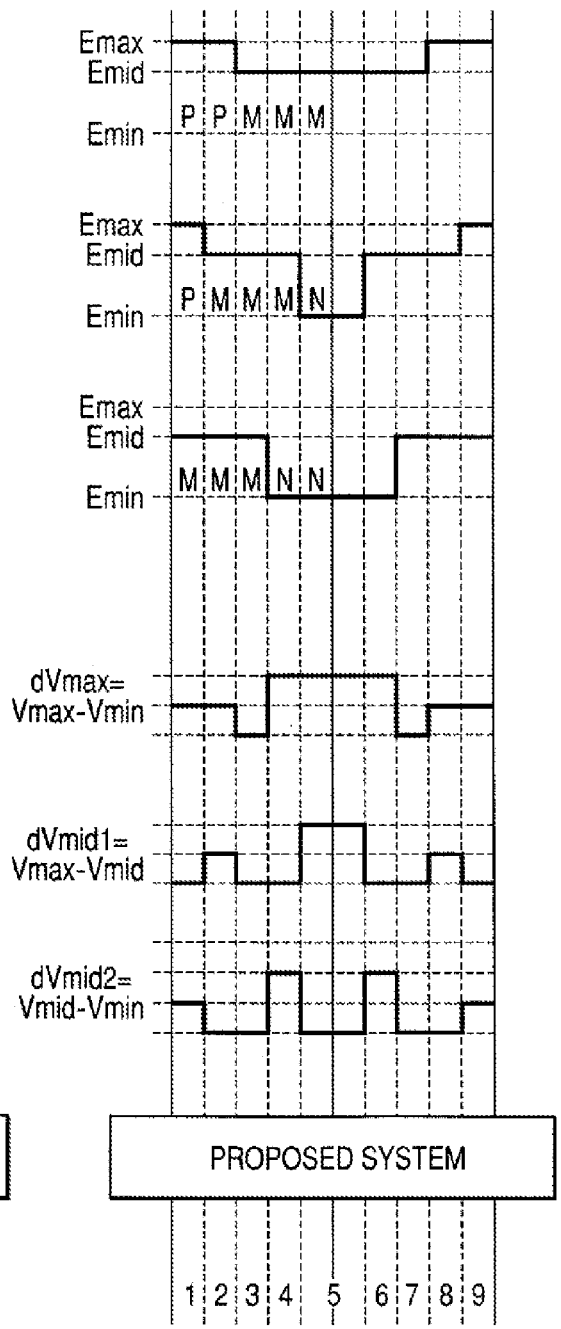

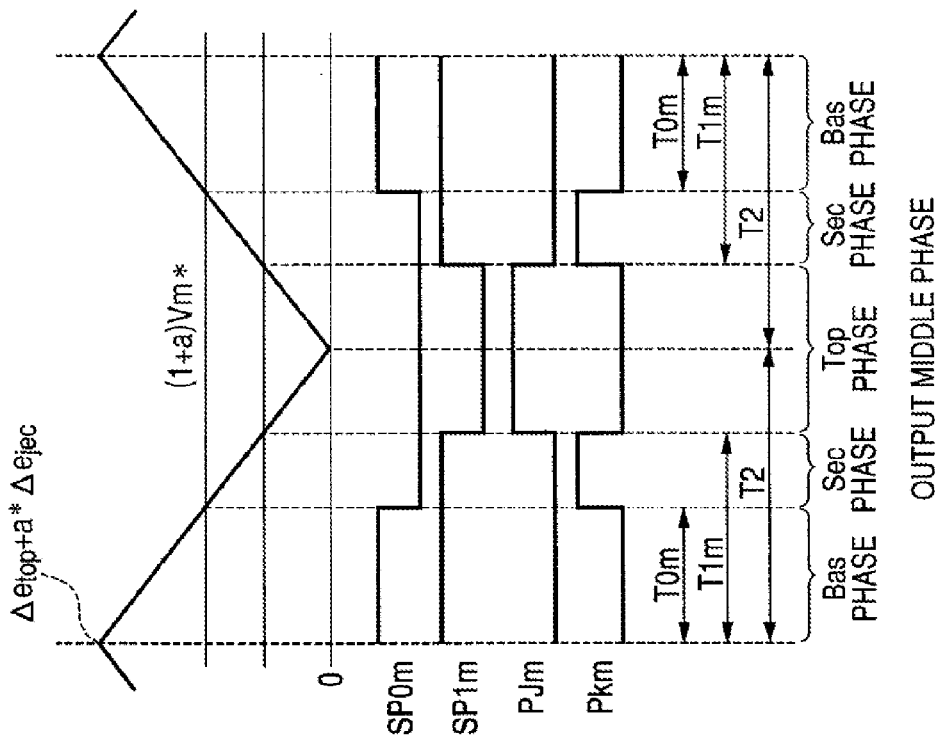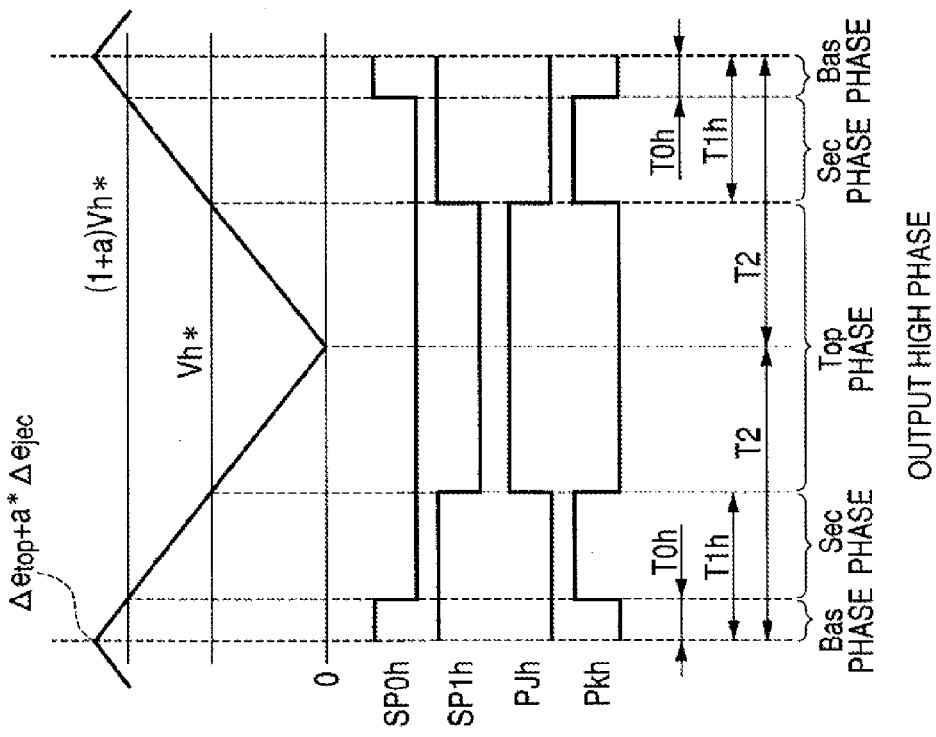

CONTROL METHOD FOR PWM CYCLO-CONVERTER BY SELECTIVELY TURNING ON A TWO-WAY SEMICONDUCTOR SWITCH AND CONTROLLER

TECHNICAL FIELD

The present invention relates to a power converter that can convert an output from an ac power source to an arbitrary frequency and more particularly to a PWM cyclo-converter using a pulse width modulation (PWM) control system.

RELATED ART

Since in the PWM cyclo-converter, an ac power source is directly connected to a load side by a semiconductor element for a power, the voltage of an output and the current of an input can be controlled at the same time. However, since a dc capacitor is not present in the PWM cyclo-converter as in a PWM inverter, the voltage not lower than an input voltage cannot be outputted. Accordingly, a two-phase modulation high in its voltage use rate is ordinarily used (for instance, see Patent Document 1).

FIG. 10 is a diagram showing a wave form of input phase information of a "controller for three phase/three phase PWM cyclo-converter". The diagram shows wave forms of input current commands ir, is and it of three phases r, s and t phases. A section number IC designates the number of each section obtained by dividing one cycle of the input current command at intervals of 60°. The IC numbers include 0 to 5 and are respectively represented by binary numbers of three bits. Further, a reference signal Be is a signal of one digital bit for identifying the code of the input current command whose absolute value is maximum. The code of the input current command whose absolute value is maximum when Be=0 is positive and the code of the input current command when Be=1 is negative. Whether the absolute value of the input current command of each input phase is minimum, intermediate or maximum is understood depending on the Be and IC. The input phase in which the absolute value of the input current command is maximum is defined as an input Bas phase, the input phase in which the absolute value of the input current command is minimum is defined as an input Sec phase and the input phase in which the absolute value is intermediate is defined as an input Top phase. An input current distribution factor a designates the ratio of the intermediate value to the minimum value of the three phase input current commands.

On the other hand, FIG. 11 is a diagram showing a wave form of output phase information of the controller for three phase/three phase PWM cyclo-converter. The diagram shows wave forms of output voltage commands Vu, Vv, Vw of three phases of u, v and w phases. A section number OC designates the number of each section obtained by dividing one cycle of the output voltage command at intervals of 60°. The OC includes 0 to 5 and each OC is represented by a binary number of three bits. An output phase in which an output phase voltage command is maximum when the reference signal Be is 1 is defined as an output High phase, an output phase in which an output phase voltage command is minimum when the reference signal Be is 1 is defined as an output Low phase and an output phase in which the an output phase voltage command is intermediate thereof is defined as an output Middle phase.

An output voltage command function Fh represents a difference between a maximum value and a minimum value of a three-phase symmetrical sine wave having the same frequency and the same phase of an amplitude 1 as those of the output phase voltage command shown below the output phase voltage command in FIG. 11. Another output voltage command function Fm represents a difference between an intermediate value and the minimum value. On the basis of the output voltage command functions Fh and Fm, the input current distribution factor a of the input current command, the reference signal Be, the phase γ of the input current command of the phase r, and power supply line voltage Vrs, Vst or the like, a virtual dc voltage Ed, the absolute value Vh* of a line voltage command between the output High phase and the output Low phase and the absolute value of a line voltage command between the output Middle phase and the output Low phase are obtained to calculate switching timings T0$h$, T1$h$, T0$m$ and T1$m$ in accordance with below-described formulas.

$$Ed = \Delta etop + a * \Delta esec,$$

In this case, Δetop: the absolute value of a line voltage between the input Top phase and the input Bas phase, Δesec: the absolute value between a line voltage between the input Sec phase and the input Bas phase.

$$Vh^* = Fh^* V^*$$

$$Vm^* := Fm'^* V^*,$$

$$T0h/T2 = 1 - (1+a)^* Vh^*/Ed,$$

$$T1h/T2 = 1 - Vh^*/Ed,$$

$$T0m/T2 = 1 - (1+a)Vm^*/Ed,$$

$$T1m/T2 = 1 - Vm^*/Ed,$$

In this case, T2: a half cycle of a carrier frequency.

Switching patterns SP0$h$, SP1$h$, SP0$m$ and SP1$m$ are prepared by the switching timings obtained in accordance with the above-described formulas.

FIG. 12 shows diagrams illustrating the switching patterns of the converter for three-phase/three-phase PWM cyclo-converter. FIG. 12($a$) shows the patterns SP0$h$ and SP1$h$ of the output High phase and FIG. 12($b$) shows the patterns SP0$m$ and SP1$m$ of the output Middle phase. In the drawing, T2 designates a half cycle of a chopping wave carrier. T0$h$ and T1$h$ designate comparison timings with the carrier chopping waves of SP0$h$ and SP1$h$. T0$m$ and T1$m$ designate comparison timings with the carrier chopping waves of SP0$m$ and SP1$m$. PJh and PJm designate converting patterns obtained by converting the SP0$h$ and SP0$m$.

In the above-described switching patterns, for instance when "SP1$h$=1 and SP0$h$=1", a switch between the output High phase and the input Bas phase (the input phase in which the absolute value of the input current command is maximum) is turned on. Further, when "SP1$h$=1 and SP0$h$=0", a switch between the output High phase and the input Sec phase (the input phase in which the absolute value is minimum) is turned on. Further, when "SP1$h$=0 and SP0$h$=0", a driving operation is carried out by a switch pattern that a switch between the output High phase and the input Top phase (the input phase in which the absolute value is intermediate) is turned on. Patent Document 1: JP-A-11-341807 (FIGS. 2, 3 and 5)

DISCLOSURE OF THE INVENTION

Problems to be solved by the Invention

However, in the PWM cyclo-converter disclosed in the Patent Document 1, when an output voltage is formed only by a two-phase modulation having one phase fixed, a phenomenon arises that voltage accuracy is deteriorated during outputting a low voltage. This phenomenon arises due to a commutation operation carried out not to generate a short-circuit of an input or a release of an output when a switching operation is performed. Thus, the pulsation or the damping of a torque of a load to be driven may be possibly caused.

As means for solving this problem, a three-phase modulation is exemplified in which all three phases are switched during outputting the low voltage. However, in the three-phase modulation, since the three-phases of output phases are switched, a switching loss is increased, so that a problem arises that the rating of semiconductor elements needs to be increased or a cooling system needs to be reexamined.

Thus, it is an object of the present invention to provide a control method and a controller for a PWM cyclo-converter in which a degree of freedom in control of an input current of the PWM cyclo-converter is left and a three-phase modulation can be realized that is high in its voltage accuracy in all speed areas with the same switching loss as that of a two-phase modulation.

Means for Solving the Problems

In order to solve the above-described problems, there is provided a method for controlling a PWM cyclo-converter as a power converter for directly connecting each phase of a three-phase ac power source to each phase of the power converter having three-phase outputs by a two-way semiconductor switch that is a combination of two one-way semiconductor switches supplying electric current only in one direction and capable of being respectively independently turned on and off, wherein when the phase of the highest potential of the three-phase ac power source is called a maximum potential phase, the phase of an intermediate potential is called an intermediate potential phase and the phase of the lowest potential is called a minimum potential phase, the method including:

a step for selectively turning the two-way semiconductor switch on and off; and a step for outputting the maximum potential phase, the intermediate potential phase and the minimum potential phase to output side terminals.

More specifically, the maximum potential phase and the minimum potential phase are alternately outputted through the intermediate potential phase by a dipolar modulation in the PWM cyclo-converter.

More specifically, the turning on and off operations of the two-way semiconductor switch are repeated at intervals of short time, within the intervals of short time, a first terminal of the output side terminals outputs in order the maximum potential phase, the intermediate potential phase and the maximum potential phase, a second terminal of the output side terminals outputs in order the maximum potential phase, the intermediate potential phase, the minimum potential phase, the intermediate potential phase and the maximum potential phase, and a third terminal of the output side terminals outputs in order the intermediate potential phase, the minimum potential phase and the intermediate potential phase.

Even more specifically, the potentials are switched in nine sections of one cycle of carrier in such a way that:

in a first section and a ninth section, the maximum potential, the maximum potential and the intermediate potential are connected to three output side terminals, in a second section and an eighth section, the maximum potential, the intermediate potential and the intermediate potential are connected to the three output side terminals, in a third section and a seventh section, the intermediate potential, the intermediate potential and the intermediate potential are connected to the three output side terminals, in a fourth section and a sixth section, the intermediate potential, the intermediate potential and the minimum potential are connected to the three output side terminals, and in a fifth section, the intermediate potential, the minimum potential and the minimum potential are connected to the three output side terminals.

Even more specifically, when a phase in which the absolute value of an input voltage is maximum is negative, the potentials are switched in such a way sequence as described above, and when a phase in which the absolute value of an input voltage is maximum is positive, the potentials are switched in such a way that:

in a first section and a ninth section, the intermediate potential, the minimum potential and the minimum potential are connected to three output side terminals, in a second section and an eighth section, the intermediate potential, the intermediate potential and the minimum potential are connected to the three output side terminals, in a third section and a seventh section, the intermediate potential, the intermediate potential and the intermediate potential are connected to the three output side terminals, in a fourth section and a sixth section, the maximum potential, the intermediate potential and the intermediate potential are connected to the three output side terminals, and in a fifth section, the maximum potential, the maximum potential and the intermediate potential are connected to the three output side terminals.

Even more specifically, the potentials are switched in eleven sections of one cycle of carrier in such a way that:

in a first section and an eleventh section, the maximum potential, the maximum potential and the maximum potential are connected to the three output side terminals, in a second section and a tenth section, the maximum potential, the maximum potential and the intermediate potential are connected to the three output side terminals, in a third section and a ninth section, the maximum potential, the intermediate potential and the intermediate potential are connected to the three output side terminals, in a fourth section and an eighth section, the intermediate potential, the intermediate potential and the intermediate potential are connected to the three output side terminals, in a fifth section and a seventh section, the intermediate potential, the intermediate potential and the minimum potential are connected to the three output side terminals, and in a sixth section, the intermediate potential, the minimum potential and the minimum potential are connected to the three output side terminals.

Even more specifically, when a phase in which the absolute value of an input voltage is maximum is negative, the potentials are switched in such a sequence as described above, and when a phase in which the absolute value of an input voltage is maximum is positive, the potentials are switched in such a way that:

in a first section and an eleventh section, the minimum potential, the minimum potential and the minimum potential are connected to three output side terminals, in a second section and a tenth section, the intermediate potential, the minimum potential and the minimum potential are connected to the three output side terminals, in a third section and a ninth section, the intermediate potential, the intermediate potential and the minimum potential are connected to the three output side terminals, in a fourth section and an eighth section, the intermediate potential, the intermediate potential and the intermediate potential are connected to the three output side terminals, in a fifth section and a seventh section, the maximum potential, the intermediate potential and the intermediate potential are connected to the three output side terminals, and in a sixth section, the maximum potential, the maximum potential and the intermediate potential are connected to the three output side terminals.

Even more specifically, the connecting time of the first section and the ninth section is obtained from a formula (1), the connecting time of the second section and the eighth section is obtained from a formula (2), the connecting time of the third section and the seventh section is obtained from a formula (3), the connecting time of the fourth section and the sixth section is obtained from a formula (4), and the connecting time of the fifth section is obtained form a formula (5) to switch the potentials.

[Mathematical Formula 1]

$$\text{connecting time of sections 1 and 9} = \frac{E_{max}T_s(V_{mid} - V_{min})}{2\{E_{max}(E_{max} - E_{mid}) - E_{min}(E_{mid} - E_{min})\}} \quad (1)$$

$$\text{connecting time of sections 2 and 8} = \frac{E_{max}T_s(V_{max} - V_{mid})}{2\{E_{max}(E_{max} - E_{mid}) - E_{min}(E_{mid} - E_{min})\}} \quad (2)$$

$$\text{connecting time of sections 3 and 7} = \frac{T_s}{2}\left(1 - \frac{(E_{max} - E_{min})(V_{max} - V_{min})}{\{E_{max}(E_{max} - E_{mid}) - E_{min}(E_{mid} - E_{min})\}}\right) \quad (3)$$

$$\text{connecting time of sections 4 and 6} = \frac{-E_{min}T_s(V_{mid} - V_{min})}{2\{E_{max}(E_{max} - E_{mid}) - E_{min}(E_{mid} - E_{min})\}} \quad (4)$$

$$\text{connecting time of section 5} = \frac{-2E_{min}T_s(V_{max} - V_{mid})}{2\{E_{max}(E_{max} - E_{mid}) - E_{min}(E_{mid} - E_{min})\}} \quad (5)$$

In this case, signs in the formulas are defined as described below.

Ts: repeating time of sections 1 to 9
Vmax: maximum value of output phase voltage command
Vmid: intermediate value of output phase voltage command
Vmin: minimum value of output phase voltage command
Emax: maximum value of input voltage
Emid: intermediate value of input voltage
Emin: minimum value of input voltage Even more specifically, when a phase in which the absolute value of an input voltage is maximum is negative, the sections 1 to 9 are connected in the connecting times obtained in the formulas (1) to (5) and when the phase in which the absolute value of the input voltage is maximum is positive, the connecting time of the first section and the ninth section is obtained from a formula (6), the connecting time of the second section and the eighth section is obtained from a formula (7), the connecting time of the third section and the seventh section is obtained from a formula (8), the connecting time of the fourth section and the sixth section is obtained from a formula (9), and the connecting time of the fifth section is obtained form a formula (10) to switch the potentials.

[Mathematical Formula 2]

$$\text{connecting time of sections 1 and 9} = \frac{-E_{min}T_s(V_{max} - V_{mid})}{2\{E_{max}(E_{max} - E_{mid}) - E_{min}(E_{mid} - E_{min})\}} \quad (6)$$

$$\text{connecting time of sections 2 and 8} = \frac{-E_{min}T_s(V_{mid} - V_{min})}{2\{E_{max}(E_{max} - E_{mid}) - E_{min}(E_{mid} - E_{min})\}} \quad (7)$$

$$\text{connecting time of sections 3 and 7} = \frac{T_s}{2}\left(1 - \frac{(E_{max} - E_{min})(V_{max} - V_{min})}{\{E_{max}(E_{max} - E_{mid}) - E_{min}(E_{mid} - E_{min})\}}\right) \quad (8)$$

$$\text{connecting time of sections 4 and 6} = \frac{E_{max}T_s(V_{max} - V_{mid})}{2\{E_{max}(E_{max} - E_{mid}) - E_{min}(E_{mid} - E_{min})\}} \quad (9)$$

$$\text{connecting time of section 5} = \frac{2E_{max}T_s(V_{mid} - V_{min})}{2\{E_{max}(E_{max} - E_{mid}) - E_{min}(E_{mid} - E_{min})\}} \quad (10)$$

In this case, signs in the formula are defined as described below.

Ts: repeating time of sections 1 to 9
Vmax: maximum value of output phase voltage command
Vmid: intermediate value of output phase voltage command
Vmin: minimum value of output phase voltage command
Emax: maximum value of input voltage
Emid: intermediate value of input voltage
Emin: minimum value of input voltage More specifically, the connecting time of the second section and the tenth section is obtained from a formula (1), the connecting time of the third section and the ninth section is obtained from a formula (2), the connecting time of the total sections of the first section+ the fourth section and the total sections of the eighth section+ the eleventh section is obtained from a formula (3), the connecting time of the fifth section and the seventh section is obtained from a formula (4), and the connecting time of the sixth section is obtained form a formula (5) to switch the potentials.

[Mathematical Formula 3]

connecting time of sections 2 and 10 (1)
$$= \frac{E_{max} T_s (V_{mid} - V_{min})}{2\{E_{max}(E_{max} - E_{mid}) - E_{min}(E_{mid} - E_{min})\}}$$

connecting time of sections 3 and 9 (2)
$$= \frac{E_{max} T_s (V_{max} - V_{mid})}{2\{E_{max}(E_{max} - E_{mid}) - E_{min}(E_{mid} - E_{min})\}}$$

total time of sections
1 + 4 and total time of sections 8 + 11 (3)
$$= \frac{T_s}{2}\left(1 - \frac{(E_{max} - E_{min})(V_{max} - V_{min})}{\{E_{max}(E_{max} - E_{mid}) - E_{min}(E_{mid} - E_{min})\}}\right)$$

connecting time of sections 5 and 7 (4)
$$= \frac{-E_{min} T_s (V_{mid} - V_{min})}{2\{E_{max}(E_{max} - E_{mid}) - E_{min}(E_{mid} - E_{min})\}}$$

connecting time of section 6 (5)
$$= \frac{-2 E_{min} T_s (V_{max} - V_{mid})}{2\{E_{max}(E_{max} - E_{mid}) - E_{min}(E_{mid} - E_{min})\}}$$

In this case, signs in the formula are defined as described below.
Ts: repeating time of sections 1 to 11
Vmax: maximum value of output phase voltage command
Vmid: intermediate value of output phase voltage command
Vmin: minimum value of output phase voltage command
Emax: maximum value of input voltage
Emid: intermediate value of input voltage
Emin: minimum value of input voltage More specifically,
when the phase in which the absolute value of the input voltage is maximum is negative, the sections 1 to 11 are connected in the connecting times obtained by the formulas (1) to (5) and
when the phase in which the absolute value of the input voltage is maximum is positive,
the connecting time of the second section and the tenth section is obtained from a formula (6),
the connecting time of the third section and the ninth section is obtained from a formula (7),
the connecting time of the total sections of the first section+ the fourth section and the total sections of the eighth section+ the eleventh section is obtained from a formula (8),
the connecting time of the fifth section and the seventh section is obtained from a formula (9), and
the connecting time of the sixth section is obtained form a formula (10) to switch the potentials.

[Mathematical Formula 4]

connecting time of sections 2 and 10 (6)
$$= \frac{-E_{min} T_s (V_{max} - V_{mid})}{2\{E_{max}(E_{max} - E_{mid}) - E_{min}(E_{mid} - E_{min})\}}$$

connecting time of sections 3 and 9 (7)
$$= \frac{-E_{min} T_s (V_{mid} - V_{min})}{2\{E_{max}(E_{max} - E_{mid}) - E_{min}(E_{mid} - E_{min})\}}$$

total time of sections
1 + 4 and total time of sections 8 + 11 (8)
$$= \frac{T_s}{2}\left(1 - \frac{(E_{max} - E_{min})(V_{max} - V_{min})}{\{E_{max}(E_{max} - E_{mid}) - E_{min}(E_{mid} - E_{min})\}}\right)$$

connecting time of sections 5 and 7 (9)
$$= \frac{E_{max} T_s (V_{max} - V_{mid})}{2\{E_{max}(E_{max} - E_{mid}) - E_{min}(E_{mid} - E_{min})\}}$$

connecting time of section 6 (10)
$$= \frac{2 E_{max} T_s (V_{mid} - V_{min})}{2\{E_{max}(E_{max} - E_{mid}) - E_{min}(E_{mid} - E_{min})\}}$$

In this case, signs in the formula are defined as described below.
Ts: repeating time of sections 1 to 11
Vmax: maximum value of output phase voltage command
Vmid: intermediate value of output phase voltage command
Vmin: minimum value of output phase voltage command
Emax: maximum value of input voltage
Emid: intermediate value of input voltage
Emin: minimum value of input voltage More specifically, there is provided the method for controlling the PWM cyclo-converter wherein
the potentials are switched in nine sections of one cycle of carrier,
when the phase in which the absolute value of the input voltage is maximum is negative, the potentials are switched in accordance with the sequence as described in paragraphs [0024]-[0030] and
when the phase in which the absolute value of the input voltage is maximum is positive, the potentials are switched in accordance with the sequence as described in paragraphs [0031]-[0038].

More specifically, there is provided the method for controlling the PWM cyclo-converter, wherein
the potentials are switched in eleven sections of one cycle of carrier,
when the phase in which the absolute value of the input voltage is maximum is negative, the potentials are switched in accordance with the sequence as described in paragraph [0039]-[0046], and
when the phase in which the absolute value of the input voltage is maximum is positive, the potentials are switched in accordance with the sequence as described in paragraph [0047]-[0055].

More specifically, there is provided the method for controlling the PWM cyclo-converter, wherein
the potentials are switched to the first section to the ninth section,
when the phase in which the absolute value of the input voltage is maximum is negative, the potentials are switched to the first section to the ninth section in accordance with the connecting times obtained in the formulas (1) to (5), and
when the phase in which the absolute value of the input voltage is maximum is positive, the potentials are switched to the first section to the ninth section in accordance with the connecting times obtained in the formulas (6) to (10).

More specifically, there is provided the method for controlling the PWM cyclo-converter wherein
the potentials are switched to the first section to the eleventh section,
when the phase in which the absolute value of the input voltage is maximum is negative, the potentials are switched to the first section to the eleventh section in accordance with the connecting times obtained in the formulas (1) to (5) and when the phase in which the absolute value of the input voltage is maximum is positive, the potentials are switched to the first section to the eleventh section in accordance with the connecting times obtained in the formulas (6) to (10).

More specifically, there is provided an apparatus for controlling a PWM cyclo-converter for directly connecting each phase of a three-phase ac power source to each phase of a power converter having three-phase outputs by a two-way semiconductor switch that is a combination of two one-way semiconductor switches supplying electric current only in one direction and capable of being respectively independently turned on and off, the apparatus including:

an input filter inserted between the three-phase ac power source and a group of two-way switches;

an input power amplitude/phase detector for detecting a voltage from the input side of the input filter to detect input phase voltages Er, Es and Et and an input voltage phase θ e for controlling the PWM cyclo-converter;

a voltage command generator for inputting a speed command Nref to calculate an output voltage Vref and an output voltage phase θ v; and a pulse generation distributor for calculating respectively the turning on/off times of the two-way switches from the input phase voltages Er, Es and Et, the input voltage phase θ e, the output voltage Vref and the output voltage phase θ v.

More specifically, there is provided the apparatus for controlling the PWM cyclo-converter, wherein the pulse generation distributor controls the two-way switches to be turned on/off by using a method for controlling the PWM cyclo-converter.

Advantage of the Invention

According to the present invention, since a switching loss the same as that of a two-phase modulation and a voltage accuracy the same as that of a three-phase modulation can be simultaneously realized and a voltage can be accurately outputted, a power converter with low loss and good accuracy can be effectively provided.

BRIEF DESCRIPTION OF THE DRAWINGS

FIG. 5 is a diagram showing a switching pattern in an input section of "0" and an output section of "0" in the present invention.

FIG. 6 is a diagram showing a switching pattern in an input section of "1" and an output section of "0" in the present invention.

FIGS. 7(a) and 7(b) show diagrams respectively illustrating voltage wave form examples according to the switching patterns of the present invention.

FIGS. 8(a) and 8(b) shows diagrams respectively illustrating voltage waveform examples according to the switching patterns of the present invention when the number of sections is 11.

FIGS. 9(a) and 9(b) show comparison diagrams of voltage wave forms respectively for explaining effects of the present invention.

FIGS. 12(a) and 12(b) are diagrams showing a switching pattern of the usual controller for a three-phase/three-phase PWM cyclo-converter.

DESCRIPTION OF REFERENCE NUMERALS AND SIGNS

Figure 1:
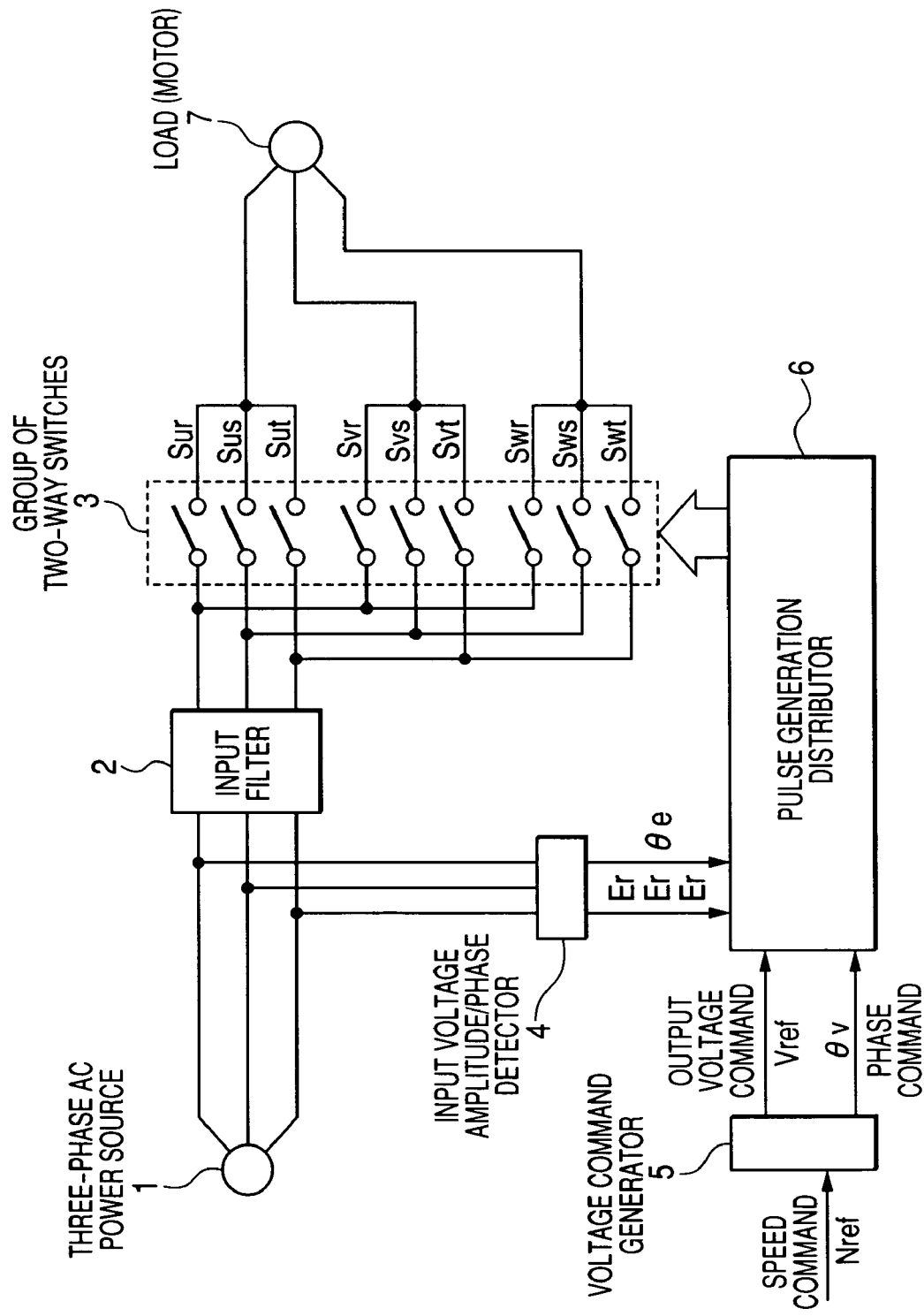
FIG. 1 is a control block diagram of a PWM cyclo-converter according to the present invention.

1 . . . three-phase ac power source
2 . . . input filter
3 . . . group of two-way switches
4 . . . input voltage amplitude/phase detector
5 . . . voltage command generator
6 . . . pulse generation distributor
7 . . . load motor Best Mode for Carrying Out the Invention Now, an embodiment of the present invention will be described below by referring to the drawings.

First Embodiment

FIG. 1 is a control block diagram of a PWM cyclo-converter according to the present invention.

Figure 2:
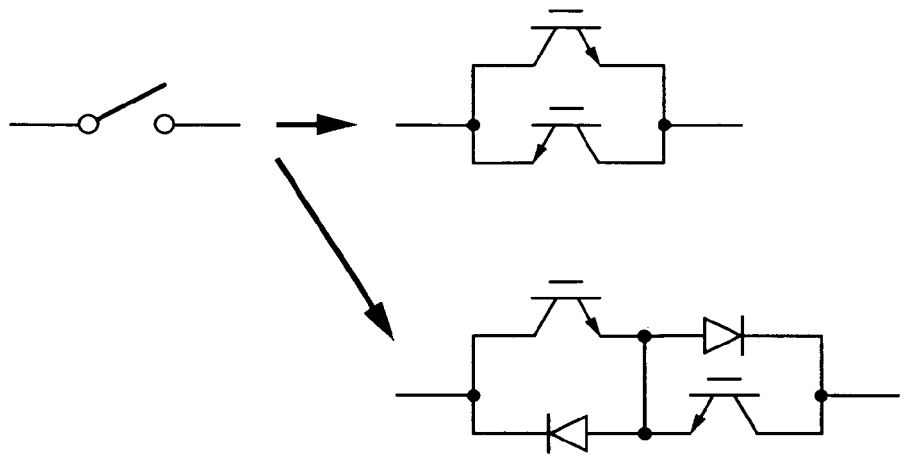
FIG. 2 is a diagram showing a connecting example of a two-way switch forming a main circuit of the PWM cyclo-converter shown in FIG. 1.

FIG. 2 is a diagram showing a connecting example of a two-way switch forming a main circuit of the PWM cyclo-converter shown in FIG. 1.

Figure 3:
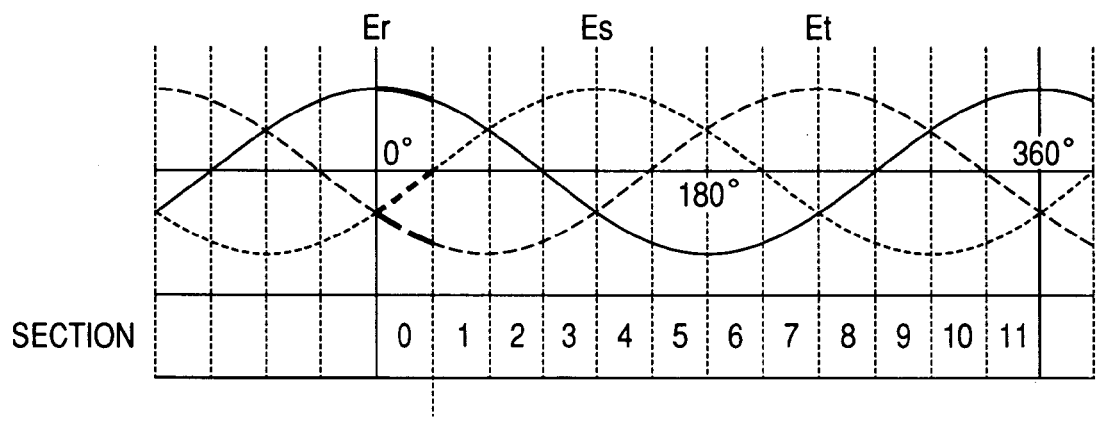
FIG. 3 is a diagram showing sections of an input phase for explaining a switching system of the present invention.

FIG. 3 is a diagram showing sections of an input phase for explaining a switching system of the present invention.

Figure 4:
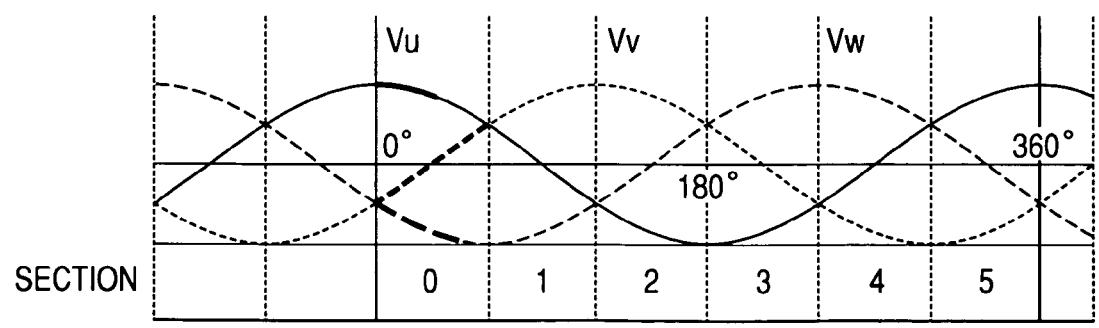
FIG. 4 is a diagram showing sections of an output phase for explaining the switching system of the present invention.
Figure 10:
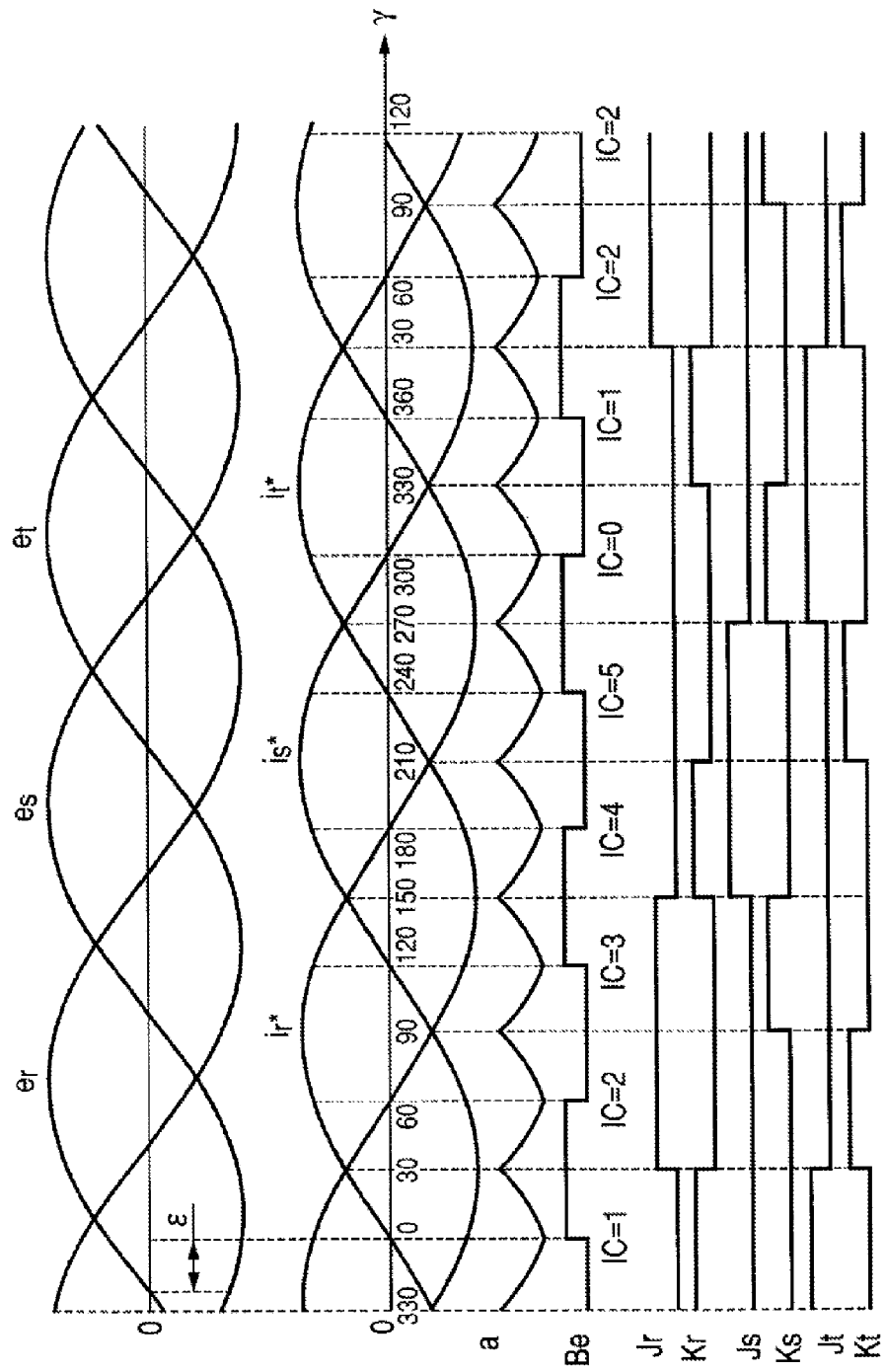
FIG. 10 is a waveform diagram of input phase information of a usual controller for a three-phase/three-phase PWM cyclo-converter.
Figure 11:
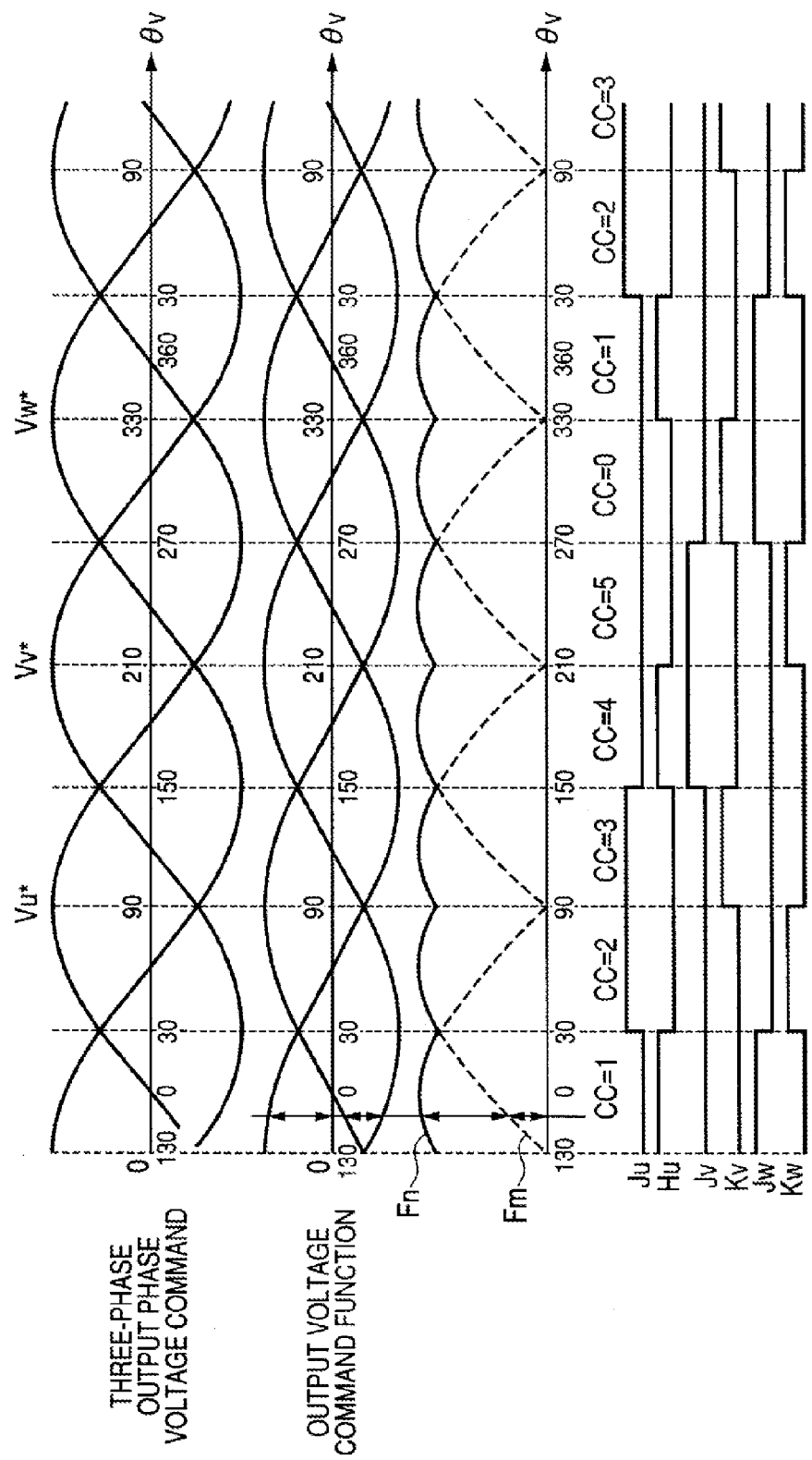
FIG. 11 is a waveform diagram of output phase information of the usual controller for a three-phase/three-phase PWM cyclo-converter.

FIG. 4 is a diagram showing sections of an output phase for explaining the switching system of the present invention.

FIG. 5 is a diagram showing a switching pattern in an input section of 0 and an output section of 0 in the present invention.

FIG. 6 is a diagram showing a switching pattern in an input section of 1 and an output section of 0 in the present invention.

FIGS. 7(a) and 7(b) show diagrams respectively illustrating voltage wave form examples according to the switching patterns of the present invention.

FIGS. 8(a) and 8(b) show diagrams respectively illustrating voltage wave form examples according to the switching patterns of the present invention when the number of sections is 11.

FIGS. 9(a) and 9(b) show comparison diagrams of voltage wave forms respectively for explaining effects of the present invention.

In FIG. 1, an input filter 2 is provided between a three-phase ac power source 1 and a group of two-way switches 3 including two-way switches Sur to Swt. The outputs of the group of two-way switches 3 are connected to a load motor 7. The input filter 2 and the group of two-way switches 3 form a main circuit of a PWM cyclo-converter. Voltage is detected from an input side (a primary side) of the input filter 2 to detect input phase voltages Er, Es and Et and an input voltage phase θ e necessary for controlling the PWM cyclo-converter by an input power amplitude/phase detector 4. On the other hand, a speed command Nref is inputted by a voltage command generator 5 to calculate an output voltage Vref and an output voltage phase θ v. A pulse generation distributor 6 calculates the nine turning on/off times of the two-way switches Sur to Swt from the input phase voltages Er, Es and Et, the input voltage phase θe, the output voltage Vref and the output voltage phase θv. The two-way switches Sur to Swt may be formed by combining reverse blocking type IGBTs inversely parallel with each other, or by combining diodes connected in series to IGBTs inversely parallel with each other as shown in FIG. 2.

Now, a process of the pulse generation distributor 6 will be mainly described below in detail.

The PWM cyclo-converter is a power converter in which an input (a power source side) is directly connected an output (a load side) by the two-way switches and an alternating current can be directly formed from an alternating current. As shown in FIG. 3, an input voltage phase of the three-phase power source 1 is divided into 12 sections. Further, as shown in FIG. 4, an output voltage phase is divided into 6 sections. The potential of each phase of input and output voltage continuously changes depending on the phase.

Here, the association of FIGS. 3 to 7(a) and FIG. 7(b) respectively will be described below.

FIG. 3 is a diagram showing sections of an input phase for explaining a switching system of the present invention. Since an input side is connected to a commercial power source, the input side has a prescribed cycle as long as 50 Hz or 60 Hz. FIG. 4 is a diagram showing sections of an output phase for explaining the switching system of the present invention. The output phase changes depending on the angle of an actual motor.

An output section in FIG. 4 corresponding to an input section of "0" in FIG. 3 has 6 patterns of "0" to "5". Similarly, an output section in FIG. 4 corresponding to an input section of "1" in FIG. 3 also has 6 patterns of "0" to "5". An output section in FIG. 4 corresponding to an input section of "2" in FIG. 3 also has 6 patterns of "0" to "5". Accordingly, the output sections in FIG. 4 corresponding to 12 sections as all the input sections "0" to "11" in FIG. 3 include 72 patterns of 12×6.

FIGS. 5 and 7(a) show switch ON patterns and voltage wave form examples respectively when the input phase is "0" and the output phase is "0". FIGS. 6 and 7(b) show switch ON patterns and voltage wave form examples respectively when the input phase is "1" and the output phase is "0".

Now, when a condition is considered in which the input section of FIG. 3 is "0" and the output section of FIG. 4 is "0", the sections of 1 to 9 in FIG. 7(a) enter the above-described sections many times. The above-described matter is explained by using actual numeric values. Assuming that an input power source has 50 Hz and an output frequency is 50 Hz, when an input is synchronous with an output and the phases of them are the same, the input section of "0" has 20 ms/12=1.67 ms. Assuming that a carrier frequency has 10 kHz, since one cycle has 100 μs, the patterns shown in FIG. 7 appear 16 times or 17 times in the input section of "0".

Now, a process of the section of "0" of the input voltage phase and the section of "0" of the output voltage phase will be firstly described. FIG. 5 shows the switching pattern of the two-way switch for realizing the switching system of the present invention. The items of a table shown in FIG. 5 will be respectively described from the left side. An [output phase] indicates that a relevant section is a section of "0" and an output phase section of 0 to 60 degrees as shown in FIG. 4 and a maximum value Vmax=Vu, an intermediate value Vmid=Vv and an minimum value Vmin=Vw. Next [sections] a, b, c, d, and e correspond to below-described sections shown in FIGS. 7(a) and 7(b).

Next [Vmax] designates Vu herein, and represents on/off of three terminals UR, US and UT connected to the input voltages Er, Es and Et by three bits. [Vmax] represents "010" in the section a. Similarly, in the section a, [Vmid] represents "001" and [Vmin] represents "001". In the next section b, Vmax represents "010", Vmid represents "010" and Vmin represents "001" . . . . In such a way, the two-way switches Sur to Swt are turned on/off in accordance with the on/off patterns shown in FIG. 5. Here, on is designated by "1" and off is designated by "0".

FIG. 7(a) shows voltage wave forms when a switching operation (a comparison with a carrier or a vector calculation) is performed in accordance with the patterns shown in FIG. 5. In FIG. 7(a), Ebase designates reference input voltage. In this section, a voltage wave form showing Emax=Ebase is outputted. The sections 1 to 5 of the sections 1 to 9 correspond to the sections a to e of the switching pattern diagram shown in FIG. 5. Further, P, M and N correspond to P=a maximum value, M=an intermediate value and N=a minimum value.

An uppermost input voltage switch block of Emax, Emid and Emin corresponds to Vmax of the output voltage side. A next block of Emax, Emid and Emin corresponds to Vmid. The last block of Emax, Emid and Emin corresponds to Vmin. dVmax=Vmax−Vmin, dVmid1=Vmax−Vmid, and dVmid2=Vmid−Vmin shown below them designate output line voltages.

Further, the sections 3 and 7 that are painted out designate what is called zero vectors in which all switches are connected to the intermediate phase Emid of the input voltage.

Switching times 1 to 9 shown in FIG. 7(a) can be expressed as in Table 1. In the numbers of formulas in the Table are identical with the numbers of formulas described in claims.

TABLE 1

| PWM section | Formula | Switching time |
|---|---|---|
| 1, 9 | (6) | $\dfrac{-E_{min}T_s(V_{max}-V_{mid})}{2\{E_{max}(E_{max}-E_{mid})-E_{min}(E_{mid}-E_{min})\}}$ |
| 2, 8 | (7) | $\dfrac{-E_{min}T_s(V_{mid}-V_{min})}{2\{E_{max}(E_{max}-E_{mid})-E_{min}(E_{mid}-E_{min})\}}$ |
| 3, 7 | (8) | $\dfrac{T_s}{2}\left(1-\dfrac{(E_{max}-E_{min})(V_{max}-V_{min})}{\{E_{max}(E_{max}-E_{mid})-E_{min}(E_{mid}-E_{min})\}}\right)$ |
| 4, 6 | (9) | $\dfrac{E_{max}T_s(V_{max}-V_{mid})}{2\{E_{max}(E_{max}-E_{mid})-E_{min}(E_{mid}-E_{min})\}}$ |
| 5 | (10) | $\dfrac{2E_{max}T_s(V_{mid}-V_{min})}{2\{E_{max}(E_{max}-E_{mid})-E_{min}(E_{mid}-E_{min})\}}$ |

Now, the switch ON patterns and voltage wave form examples when the input phase in FIG. 3 is "1" and the output phase in FIG. 4 is "0" will be respectively described in accordance with FIGS. 6 and 7(b). In FIG. 6, in a section a, Vmax=Vu represents "100", Vmid=Vv represent "100" and Vmin=Vw represents "010". In a next section b, Vmax=Vu represents "100", Vmid=Vv represents "010" and Vmin=Vw represents "010" . . . . (the following is the same as described above).

In FIG. 7(b) showing the output voltage wave forms corresponding to the switch patterns in FIG. 6, upper stages indicate Vmax, Vmid and Vmin respectively designated by Emax, Emid and Emin and lower stages respectively designate line voltages dVmax=max−Vmin, dVmid1=Vmax−Vmid and dVmid2=Vmid−Vmin.

In the voltage waveforms shown in FIG. 7(b), in the sections, a reference input potential Ebase outputs the voltage wave form when Emin=Ebase. Switching times 1 to 9 in FIG. 7(b) can be expressed as in Table 2. The numbers of formulas in the Table are identical with the numbers of formulas described in claims.

TABLE 2

| Section | Formula | Setting time of timer |
|---|---|---|
| 1, 9 | (1) | $\dfrac{E_{max}T_s(V_{mid} - V_{min})}{2\{E_{max}(E_{max} - E_{mid}) - E_{min}(E_{mid} - E_{min})\}}$ |
| 2, 8 | (2) | $\dfrac{E_{max}T_s(V_{max} - V_{mid})}{2\{E_{max}(E_{max} - E_{mid}) - E_{min}(E_{mid} - E_{min})\}}$ |
| 3, 7 | (3) | $\dfrac{T_s}{2}\left(1 - \dfrac{(E_{max} - E_{min})(V_{max} - V_{min})}{\{E_{max}(E_{max} - E_{mid}) - E_{min}(E_{mid} - E_{min})\}}\right)$ |
| 4, 6 | (4) | $\dfrac{-E_{min}T_s(V_{mid} - V_{min})}{2\{E_{max}(E_{max} - E_{mid}) - E_{min}(E_{mid} - E_{min})\}}$ |
| 5 | (5) | $\dfrac{-E_{min}T_s(V_{max} - V_{mid})}{\{E_{max}(E_{max} - E_{mid}) - E_{min}(E_{mid} - E_{min})\}}$ |

In the case of the input section of "0" in FIG. 3 and the output section "0" in FIG. 4 and in the case of the input section of "1" in FIG. 3 and the output section of "0" in FIG. 4, the switch ON patterns and the voltage wave form examples are respectively described above. As remaining sections, in the case of the input section of "0" in FIG. 3 and the output sections of "1" to "5" in FIG. 4, in the case of the input section of "1" in FIG. 3 and the output sections of "1" to "5" in FIG. 4 and in the case of the input sections "2" to "11" in FIG. 3 and the output sections of "0" to "5" in FIG. 4 respectively corresponding to the sections, the switch ON patterns and the voltage wave form examples can be respectively obtained in the same manner.

As described above, even when the same output phases are outputted, if the phases of the input voltage are different, FIGS. 7(a) and (b) are switched to output the output phases.

The present invention includes the above-described switching patterns. (Here, in the relation between FIGS. 7(a) and 7(b), that is, the relation between FIGS. 5 and 6, FIGS. 6 and 7(b) show a case that when the phase in which the absolute value of the input voltage is maximum is negative, Emin=Ebase, and FIGS. 5 and 7(a) show a case that when the phase in which the absolute value of the input voltage is maximum is positive, Emax=Ebase. An embodiment is shown in FIG. 7(a)). Therefore, "the maximum potential phase, the intermediate potential phase, the maximum potential phase . . . " according to this embodiment means, for instance, Vmax: from PPMMM to MMMPP. The second "maximum potential phase, the intermediate potential phase, the minimum potential phase, the intermediate potential phase and the maximum potential phase" means Vmid: from PMMMN to NMMMP. The third "intermediate potential phase, the minimum potential phase and the intermediate potential phase" means Vmin: from MMMNN to NNMMM.

A connection to "the maximum potential, the maximum potential and the intermediate potential" in the first and ninth sections similarly disclosed in another embodiment means a lengthwise arrangement of PPM in the first and ninth sections in FIG. 7(a), that is, a column of PPM including Vmax: P, Vmid: P and Vmin: M. The "maximum potential, the intermediate potential and the intermediate potential" in the second and eighth sections means a column of PMM including Vmax: P, Vmid: M and Vmin: M in the second and eighth sections. The "intermediate potential, the intermediate potential and the intermediate potential" in the third and seventh sections means a column of MMM including Vmax: M, Vmid: M and Vmin: M. The "intermediate potential, the intermediate potential and the minimum potential" in the fourth and sixth sections means a column of MMN including Vmax: M, Vmid: M and Vmin: N. The "intermediate potential, the minimum potential and the minimum potential" in the fifth section means a column of MNN including Vmax: M, Vmid: N and Vmin: N, respectively. FIG. 7(a) includes another embodiment where the phase in which the absolute value of the input voltage is maximum is negative (Emin=Ebase), and FIG. 7(b) includes another embodiment where the phase in which the absolute value of the input voltage is positive (Emax=Ebase) respectively.

Now, the switching patterns of the number of sections of 11 shown in FIGS. 8(a) and 8(b) will be described below. In the switching patterns, new sections "1'" and "9'" are provided before the first section and after the ninth section of the patterns shown in FIGS. 7(a) and 7(b) and respectively connected to reference potentials to increase the sections of zero vector. A connecting time in this case can be expressed by a below-described formula.

[Mathematical Formula 5]

$$\text{total time of sections } 1' + 3 \text{ and}$$
$$\text{total time of sections}$$
$$7 + 9' = \dfrac{T_s}{2}\left(1 - \dfrac{(E_{max} - E_{min})(V_{max} - V_{min})}{\{E_{max}(E_{max} - E_{mid}) - E_{min}(E_{mid} - E_{min})\}}\right)$$

This formula is the same as the formula (3) and (8) shown in the Tables 1 and 2. Other switching times than the above-described time can be expressed by the same formulas as the formulas (1) to (10) depending on the state of the reference potential.

Another embodiment of the switching pattern is shown in FIG. 8(a) when the phase in which the absolute value of the input voltage is maximum is negative (Emin=Ebase). Another embodiment discloses the switching pattern in FIG. 8(b) when the phase in which the absolute value of the input voltage is positive (Emax=Ebase).

Usually, as the control system of the PWM cyclo-converter, a two-phase modulation system has been ordinarily employed in which an output one-phase is fixed to a reference potential and a line voltage is formed by other two phases. As for the line voltage, an example for forming the line voltage by a proposed system (the present invention) is shown in FIG. 9(a). A usual example is shown in FIG. 9(b). Both in FIGS. 9(a) and 9(b), potentials are switched nine times. This phenomenon indicates that a switching loss is the same between the two-phase modulation system as the usual system and the system of the present invention.

However, when a low voltage is outputted, in the case of the usual system, the areas of dVmax and dVmid2 are large, the width of a pulse needs to be reduced. In that case, the voltage is not accurately outputted depending on a switching condition to cause a voltage error. However, in the case of the proposed system of the present invention, a characteristic modulation system and a efficient switching pattern are employed as described above. Thus, even when a command is decreased, the switching time of the phase voltage is not shortened, so that the voltage can be accurately outputted even under the low voltage.

When an electric motor is driven by using the PWM cyclo-converter, the output voltage needs to be lowered when the electric motor is driven at low speed. However, in the usual system, a problem arises that the voltage accuracy is deteriorated during outputting the low voltage. Thus, the present invention is employed so that the voltage can be accurately outputted. The present invention is extremely effectively applied as an indispensable technique to drive the electric motor from a low speed with good accuracy.

The invention claimed is:

1. A method for controlling a PWM cyclo-converter as a power converter for directly connecting each phase of a three-phase AC power source to each phase of the power converter having three-phase outputs by a two-way semiconductor switch that is a combination of two one-way semiconductor switches supplying electric current only in one direction and capable of being respectively independently turned on and off, wherein
when the phase of the highest potential of the three-phase AC power source is called a maximum potential phase, the phase of an intermediate potential is called an intermediate potential phase and the phase of the lowest potential is called a minimum potential phase,
the method comprising:
a step for selectively turning the two-way semiconductor switch on and off; and
a step for outputting the maximum potential phase, the intermediate potential phase and the minimum potential phase to output side terminals,
wherein
the turning on and off operations of the two-way semiconductor switch are repeated at intervals of short time, within the intervals of short time,
a first terminal of the output side terminals outputs in order the maximum potential phase, the intermediate potential phase and the maximum potential phase,
a second terminal of the output side terminals outputs in order the maximum potential phase, the intermediate potential phase, the minimum potential phase, the intermediate potential phase and the maximum potential phase, and
a third terminal of the output side terminals outputs in order the intermediate potential phase, the minimum potential phase and the intermediate potential phase.

2. The method for controlling a PWM cyclo-converter according to claim 1, wherein
the potentials are switched in nine sections of one cycle of carrier in such a way that:
in a first section and a ninth section, the maximum potential, the maximum potential and the intermediate potential are connected to three output side terminals,
in a second section and an eighth section, the maximum potential, the intermediate potential and the intermediate potential are connected to the three output side terminals,
in a third section and a seventh section, the intermediate potential, the intermediate potential and the intermediate potential are connected to the three output side terminals,
in a fourth section and a sixth section, the intermediate potential, the intermediate potential and the minimum potential are connected to the three output side terminals, and
in a fifth section, the intermediate potential, the minimum potential and the minimum potential are connected to the three output side terminals.

3. The method for controlling a PWM cyclo-converter according to claim 1, wherein
when a phase in which the absolute value of an input voltage is maximum is positive, the potentials are switched in such a way that:
in a first section and a ninth section, the intermediate potential, the minimum potential and the minimum potential are connected to three output side terminals,
in a second section and an eighth section, the intermediate potential, the intermediate potential and the minimum potential are connected to the three output side terminals,
in a third section and a seventh section, the intermediate potential, the intermediate potential and the intermediate potential are connected to the three output side terminals,
in a fourth section and a sixth section, the maximum potential, the intermediate potential and the intermediate potential are connected to the three output side terminals, and
in a fifth section, the maximum potential, the maximum potential and the intermediate potential are connected to the three output side terminals.

4. The method for controlling a PWM cyclo-converter according to claim 1, wherein
the potentials are switched in eleven sections of one cycle of carrier in such a way that:
in a first section and an eleventh section, the maximum potential, the maximum potential and the maximum potential are connected to the three output side terminals,
in a second section and a tenth section, the maximum potential, the maximum potential and the intermediate potential are connected to the three output side terminals,
in a third section and a ninth section, the maximum potential, the intermediate potential and the intermediate potential are connected to the three output side terminals,
in a fourth section and an eighth section, the intermediate potential, the intermediate potential and the intermediate potential are connected to the three output side terminals,
in a fifth section and a seventh section, the intermediate potential, the intermediate potential and the minimum potential are connected to the three output side terminals and
in a sixth section, the intermediate potential, the minimum potential and the minimum potential are connected to the three output side terminals.

5. The method for controlling a PWM cyclo-converter according to claim 1, wherein
when a phase in which the absolute value of an input voltage is maximum is positive, the potentials are switched in such a way that:
in a first section and an eleventh section, the minimum potential, the minimum potential and the minimum potential are connected to three output side terminals,
in a second section and a tenth section, the intermediate potential, the minimum potential and the minimum potential are connected to the three output side terminals,
in a third section and a ninth section, the intermediate potential, the intermediate potential and the minimum potential are connected to the three output side terminals, in a fourth section and an eighth section, the intermediate potential, the intermediate potential and the intermediate potential are connected to the three output side terminals, in a fifth section and a seventh section, the maximum potential, the intermediate potential and the intermediate potential are connected to the three output side terminals, and in a sixth section, the maximum potential, the maximum potential and the intermediate potential are connected to the three output side terminals.

6. The method for controlling a PWM cyclo-converter according to claim 2, wherein the connecting time of the first section and the ninth section is obtained from a formula (1), the connecting time of the second section and the eighth section is obtained from a formula (2), the connecting time of the third section and the seventh section is obtained from a formula (3), the connecting time of the fourth section and the sixth section is obtained from a formula (4), and the connecting time of the fifth section is obtained from a formula (5) to switch the potentials, the connecting time of sections 1 and 9 (1)
$$= \frac{E_{max}T_s(V_{mid} - V_{min})}{2\{E_{max}(E_{max} - E_{mid}) - E_{min}(E_{mid} - E_{min})\}}$$

the connecting time of sections 2 and 8 (2)
$$= \frac{E_{max}T_s(V_{max} - V_{mid})}{2\{E_{max}(E_{max} - E_{mid}) - E_{min}(E_{mid} - E_{min})\}}$$

the connecting time of sections 3 and 7 (3)
$$= \frac{T_s}{2}\left(1 - \frac{(E_{max} - E_{min})(V_{max} - V_{min})}{\{E_{max}(E_{max} - E_{mid}) - E_{min}(E_{mid} - E_{min})\}}\right)$$

the connecting time of sections 4 and 6 (4)
$$= \frac{-E_{min}T_s(V_{mid} - V_{min})}{2\{E_{max}(E_{max} - E_{mid}) - E_{min}(E_{mid} - E_{min})\}}$$

the connecting time of section 5 (5)
$$= \frac{-2E_{min}T_s(V_{max} - V_{mid})}{2\{E_{max}(E_{max} - E_{mid}) - E_{min}(E_{mid} - E_{min})\}}$$

Ts: repeating time of sections 1 to 9
Vmax: maximum value of output phase voltage command
Vmid: intermediate value of output phase voltage command
Vmin: minimum value of output phase voltage command
Emax: maximum value of input voltage
Emid: intermediate value of input voltage
Emin: minimum value of input voltage.

7. The method for controlling a PWM cyclo-converter according to claim 3, wherein when the phase in which the absolute value of the input voltage is maximum is positive, the connecting time of the first section and the ninth section is obtained from a formula (6), the connecting time of the second section and the eighth section is obtained from a formula (7), the connecting time of the third section and the seventh section is obtained from a formula (8), the connecting time of the fourth section and the sixth section is obtained from a formula (9), and the connecting time of the fifth section is obtained from a formula (10) to switch the potentials, the connecting time of sections 1 and 9 (6)
$$= \frac{-E_{min}T_s(V_{max} - V_{mid})}{2\{E_{max}(E_{max} - E_{mid}) - E_{min}(E_{mid} - E_{min})\}}$$

the connecting time of sections 2 and 8 (7)
$$= \frac{-E_{min}T_s(V_{mid} - V_{min})}{2\{E_{max}(E_{max} - E_{mid}) - E_{min}(E_{mid} - E_{min})\}}$$

the connecting time of sections 3 and 7 (8)
$$= \frac{T_s}{2}\left(1 - \frac{(E_{max} - E_{min})(V_{max} - V_{min})}{\{E_{max}(E_{max} - E_{mid}) - E_{min}(E_{mid} - E_{min})\}}\right)$$

the connecting time of sections 4 and 6 (9)
$$= \frac{E_{max}T_s(V_{max} - V_{mid})}{2\{E_{max}(E_{max} - E_{mid}) - E_{min}(E_{mid} - E_{min})\}}$$

the connecting time of section 5 (10)
$$= \frac{2E_{max}T_s(V_{mid} - V_{min})}{2\{E_{max}(E_{max} - E_{mid}) - E_{min}(E_{mid} - E_{min})\}}$$

Ts: repeating time of sections 1 to 9
Vmax: maximum value of output phase voltage command
Vmid: intermediate value of output phase voltage command
Vmin: minimum value of output phase voltage command
Emax: maximum value of input voltage
Emid: intermediate value of input voltage
Emin: minimum value of input voltage.

8. The method for controlling a PWM cyclo-converter according to claim 4, wherein the connecting time of the second section and the tenth section is obtained from a formula (1), the connecting time of the third section and the ninth section is obtained from a formula (2), the connecting time of the total sections of the first section plus the fourth section and the total sections of the eighth section plus the eleventh section is obtained from a formula (3), the connecting time of the fifth section and the seventh section is obtained from a formula (4), and the connecting time of the sixth section is obtained from a formula (5) to switch the potentials, the connecting time of sections 2 and 10 (1)
$$= \frac{E_{max}T_s(V_{mid} - V_{min})}{2\{E_{max}(E_{max} - E_{mid}) - E_{min}(E_{mid} - E_{min})\}}$$

the connecting time of sections 3 and 9 (2)
$$= \frac{E_{max}T_s(V_{max} - V_{mid})}{2\{E_{max}(E_{max} - E_{mid}) - E_{min}(E_{mid} - E_{min})\}}$$

total time of sections 1 plus 4 and total time of sections 8 plus 11 (3)
$$= \frac{T_s}{2}\left(1 - \frac{(E_{max} - E_{min})(V_{max} - V_{min})}{\{E_{max}(E_{max} - E_{mid}) - E_{min}(E_{mid} - E_{min})\}}\right)$$

the connecting time of sections 5 and 7 (4)
$$= \frac{-E_{min}T_s(V_{mid} - V_{min})}{2\{E_{max}(E_{max} - E_{mid}) - E_{min}(E_{mid} - E_{min})\}}$$

the connecting time of sections 6 (5)
$$= \frac{-2E_{min}T_s(V_{max} - V_{mid})}{2\{E_{max}(E_{max} - E_{mid}) - E_{min}(E_{mid} - E_{min})\}}$$

Ts: repeating time of sections 1 to 11

Vmax: maximum value of output phase voltage command
Vmid: intermediate value of output phase voltage command
Vmin: minimum value of output phase voltage command
Emax: maximum value of input voltage
Emid: intermediate value of input voltage
Emin: minimum value of input voltage.

9. The method for controlling a PWM cyclo-converter according to claim 5, wherein
when the phase in which the absolute value of the input voltage is maximum is positive,
the connecting time of the second section and the tenth section is obtained from a formula (6),
the connecting time of the third section and the ninth section is obtained from a formula (7),
the connecting time of the total sections of the first section plus the fourth section and the total sections of the eighth section plus the eleventh section is obtained from a formula (8),
the connecting time of the fifth section and the seventh section is obtained from a formula (9), and
the connecting time of the sixth section is obtained from a formula (10) to switch the potentials, $$\text{the connecting time of sections 2 and 10} = \frac{-E_{\min} T_s (V_{\max} - V_{mid})}{2\{E_{\max}(E_{\max} - E_{mid}) - E_{\min}(E_{mid} - E_{\min})\}} \quad (6)$$

$$\text{the connecting time of sections 3 and 9} = \frac{-E_{\min} T_s (V_{mid} - V_{\min})}{2\{E_{\max}(E_{\max} - E_{mid}) - E_{\min}(E_{mid} - E_{\min})\}} \quad (7)$$

$$\text{total time of sections 1 plus 4 and total time of sections 8 plus 11} = \frac{T_s}{2}\left(1 - \frac{(E_{\max} - E_{\min})(V_{\max} - V_{\min})}{\{E_{\max}(E_{\max} - E_{mid}) - E_{\min}(E_{mid} - E_{\min})\}}\right) \quad (8)$$

$$\text{the connecting time of sections 5 and 7} = \frac{E_{\max} T_s (V_{\max} - V_{mid})}{2\{E_{\max}(E_{\max} - E_{mid}) - E_{\min}(E_{mid} - E_{\min})\}} \quad (9)$$

$$\text{the connecting time of sections 6} = \frac{2 E_{\max} T_s (V_{mid} - V_{\min})}{2\{E_{\max}(E_{\max} - E_{mid}) - E_{\min}(E_{mid} - E_{\min})\}} \quad (10)$$

Ts: repeating time of sections 1 to 11
Vmax: maximum value of output phase voltage command
Vmid: intermediate value of output phase voltage command
Vmin: minimum value of output phase voltage command
Emax: maximum value of input voltage
Emid: intermediate value of input voltage
Emin: minimum value of input voltage.

10. The control method for a PWM cyclo-converter according to claim 1, wherein
the potentials are switched in nine sections of one cycle of carrier,
when the phase in which the absolute value of the input voltage is maximum is negative, the potentials are switched in accordance with the sequence of:
in a first section and a ninth section, the maximum potential, the maximum potential and the intermediate potential are connected to three output side terminals,
in a second section and an eighth section, the maximum potential, the intermediate potential and the intermediate potential are connected to the three output side terminals,
in a third section and a seventh section, the intermediate potential, the intermediate potential and the intermediate potential are connected to the three output side terminals,
in a fourth section and a sixth section, the intermediate potential, the intermediate potential and the minimum potential are connected to the three output side terminals, and
in a fifth section, the intermediate potential, the minimum potential and the minimum potential are connected to the three output side terminals, and
when the phase in which the absolute value of the input voltage is maximum is positive, the potentials are switched in accordance with the sequence of:
in a first section and a ninth section, the intermediate potential, the minimum potential and the minimum potential are connected to three output side terminals,
in a second section and an eighth section, the intermediate potential, the intermediate potential and the minimum potential are connected to the three output side terminals,
in a third section and a seventh section, the intermediate potential, the intermediate potential and the intermediate potential are connected to the three output side terminals,
in a fourth section and a sixth section, the maximum potential, the intermediate potential and the intermediate potential are connected to the three output side terminals, and
in a fifth section, the maximum potential, the maximum potential and the intermediate potential are connected to the three output side terminals.

11. The control method for a PWM cyclo-converter according to claim 1, wherein
the potentials are switched in eleven sections of one cycle of carrier,
when the phase in which the absolute value of the input voltage is maximum is negative, the potentials are switched in accordance with the sequence of:
in a first section and an eleventh section, the maximum potential, the maximum potential and the maximum potential are connected to the three output side terminals,
in a second section and a tenth section, the maximum potential, the maximum potential and the intermediate potential are connected to the three output side terminals,
in a third section and a ninth section, the maximum potential, the intermediate potential and the intermediate potential are connected to the three output side terminals,
in a fourth section and an eighth section, the intermediate potential, the intermediate potential and the intermediate potential are connected to the three output side terminals,
in a fifth section and a seventh section, the intermediate potential, the intermediate potential and the minimum potential are connected to the three output side terminals, and
in a sixth section, the intermediate potential, the minimum potential and the minimum potential are connected to the three output side terminals, and when the phase in which the absolute value of the input voltage is maximum is positive, the potentials are switched in accordance with the sequence of:

in a first section and an eleventh section, the minimum potential, the minimum potential and the minimum potential are connected to three output side terminals, in a second section and a tenth section, the intermediate potential, the minimum potential and the minimum potential are connected to the three output side terminals, in a third section and a ninth section, the intermediate potential, the intermediate potential and the minimum potential are connected to the three output side terminals, in a fourth section and an eighth section, the intermediate potential, the intermediate potential and the intermediate potential are connected to the three output side terminals, in a fifth section and a seventh section, the maximum potential, the intermediate potential and the intermediate potential are connected to the three output side terminals, and in a sixth section, the maximum potential, the maximum potential and the intermediate potential are connected to the three output side terminals.

12. The control method for a PWM cyclo-converter according to claim 10, wherein the potentials are switched to the first section to the ninth section, when the phase in which the absolute value of the input voltage is maximum is negative, the potentials are switched to the first section to the ninth section in accordance with the connecting time of:

the first section and the ninth section obtained from a formula (1), the second section and the eighth section obtained from a formula (2), the third section and the seventh section obtained from a formula (3), the fourth section and the sixth section obtained from a formula (4), and the fifth section obtained from a formula (5) to switch the potentials, $$\text{the connecting time of sections 1 and 9} = \frac{E_{max}T_s(V_{mid} - V_{min})}{2\{E_{max}(E_{max} - E_{mid}) - E_{min}(E_{mid} - E_{min})\}} \quad (1)$$

$$\text{the connecting time of sections 2 and 8} = \frac{E_{max}T_s(V_{max} - V_{mid})}{2\{E_{max}(E_{max} - E_{mid}) - E_{min}(E_{mid} - E_{min})\}} \quad (2)$$

$$\text{the connecting time of sections 3 and 7} = \frac{T_s}{2}\left(1 - \frac{(E_{max} - E_{min})(V_{max} - V_{min})}{\{E_{max}(E_{max} - E_{mid}) - E_{min}(E_{mid} - E_{min})\}}\right) \quad (3)$$

$$\text{the connecting time of sections 4 and 6} = \frac{-E_{min}T_s(V_{mid} - V_{min})}{2\{E_{max}(E_{max} - E_{mid}) - E_{min}(E_{mid} - E_{min})\}} \quad (4)$$

$$\text{the connecting time of section 5} = \frac{-2E_{min}T_s(V_{max} - V_{mid})}{2\{E_{max}(E_{max} - E_{mid}) - E_{min}(E_{mid} - E_{min})\}} \quad (5)$$

Ts: repeating time of sections 1 to 9
Vmax: maximum value of output phase voltage command
Vmid: intermediate value of output phase voltage command
Vmin: minimum value of output phase voltage command
Emax: maximum value of input voltage
Emid: intermediate value of input voltage
Emin: minimum value of input voltage, and when the phase in which the absolute value of the input voltage is maximum is positive, the potentials are switched to the first section to the ninth section in accordance with the connecting time of:

the first section and the ninth section obtained from a formula (6), the second section and the eighth section obtained from a formula (7), the third section and the seventh section obtained from a formula (8), the fourth section and the sixth section obtained from a formula (9), and the fifth section obtained from a formula (10) to switch the potentials, $$\text{the connecting time of sections 1 and 9} = \frac{-E_{min}T_s(V_{max} - V_{mid})}{2\{E_{max}(E_{max} - E_{mid}) - E_{min}(E_{mid} - E_{min})\}} \quad (6)$$

$$\text{the connecting time of sections 2 and 8} = \frac{-E_{min}T_s(V_{mid} - V_{min})}{2\{E_{max}(E_{max} - E_{mid}) - E_{min}(E_{mid} - E_{min})\}} \quad (7)$$

$$\text{the connecting time of sections 3 and 7} = \frac{T_s}{2}\left(1 - \frac{(E_{max} - E_{min})(V_{max} - V_{min})}{\{E_{max}(E_{max} - E_{mid}) - E_{min}(E_{mid} - E_{min})\}}\right) \quad (8)$$

$$\text{the connecting time of sections 4 and 6} = \frac{E_{max}T_s(V_{max} - V_{mid})}{2\{E_{max}(E_{max} - E_{mid}) - E_{min}(E_{mid} - E_{min})\}} \quad (9)$$

$$\text{the connecting time of section 5} = \frac{2E_{max}T_s(V_{mid} - V_{min})}{2\{E_{max}(E_{max} - E_{mid}) - E_{min}(E_{mid} - E_{min})\}} \quad (10)$$

Ts: repeating time of sections 1 to 9
Vmax: maximum value of output phase voltage command
Vmid: intermediate value of output phase voltage command
Vmin: minimum value of output phase voltage command
Emax: maximum value of input voltage
Emid: intermediate value of input voltage
Emin: minimum value of input voltage.

13. The control method for a PWM cyclo-converter according to claim 11, wherein the potentials are switched to the first section to the eleventh section, when the phase in which the absolute value of the input voltage is maximum is negative, the potentials are switched to the first section to the eleventh section in accordance with the connecting time of:

the second section and the tenth section obtained from a formula (1), the third section and the ninth section obtained from a formula (2), the total sections of the first section plus the fourth section and the total sections of the eighth section plus the eleventh section obtained from a formula (3), the fifth section and the seventh section obtained from a formula (4), and the sixth section obtained from a formula (5) to switch the potentials, the connecting time of sections 2 and 10
$$= \frac{E_{max} T_s (V_{mid} - V_{min})}{2\{E_{max}(E_{max} - E_{mid}) - E_{min}(E_{mid} - E_{min})\}} \quad (1)$$

the connecting time of sections 3 and 9
$$= \frac{E_{max} T_s (V_{max} - V_{mid})}{2\{E_{max}(E_{max} - E_{mid}) - E_{min}(E_{mid} - E_{min})\}} \quad (2)$$

total time of sections 1 plus 4 and total time of sections 8 plus 11
$$= \frac{T_s}{2}\left(1 - \frac{(E_{max} - E_{min})(V_{max} - V_{min})}{\{E_{max}(E_{max} - E_{mid}) - E_{min}(E_{mid} - E_{min})\}}\right) \quad (3)$$

the connecting time of sections 5 and 7
$$= \frac{-E_{min} T_s (V_{mid} - V_{min})}{2\{E_{max}(E_{max} - E_{mid}) - E_{min}(E_{mid} - E_{min})\}} \quad (4)$$

the connecting time of sections 6
$$= \frac{-2E_{min} T_s (V_{max} - V_{mid})}{2\{E_{max}(E_{max} - E_{mid}) - E_{min}(E_{mid} - E_{min})\}} \quad (5)$$

Ts: repeating time of sections 1 to 11
Vmax: maximum value of output phase voltage command
Vmid: intermediate value of output phase voltage command
Vmin: minimum value of output phase voltage command
Emax: maximum value of input voltage
Emid: intermediate value of input voltage
Emin: minimum value of input voltage, and
when the phase in which the absolute value of the input voltage is maximum is positive, the potentials are switched to the first section to the eleventh section in accordance with the connecting time of:
the second section and the tenth section obtained from a formula (6),
the third section and the ninth section obtained from a formula (7),
the total sections of the first section plus the fourth section and the total sections of the eighth section plus the eleventh section obtained from a formula (8),
the fifth section and the seventh section obtained from a formula (9), and
the sixth section is obtained from a formula (10) to switch the potentials, the connecting time of sections 2 and 10
$$= \frac{-E_{min} T_s (V_{max} - V_{mid})}{2\{E_{max}(E_{max} - E_{mid}) - E_{min}(E_{mid} - E_{min})\}} \quad (6)$$

the connecting time of sections 3 and 9
$$= \frac{-E_{min} T_s (V_{mid} - V_{min})}{2\{E_{max}(E_{max} - E_{mid}) - E_{min}(E_{mid} - E_{min})\}} \quad (7)$$

total time of sections 1 plus 4 and total time of sections 8 plus 11
$$= \frac{T_s}{2}\left(1 - \frac{(E_{max} - E_{min})(V_{max} - V_{min})}{\{E_{max}(E_{max} - E_{mid}) - E_{min}(E_{mid} - E_{min})\}}\right) \quad (8)$$

the connecting time of sections 5 and 7
$$= \frac{E_{max} T_s (V_{max} - V_{mid})}{2\{E_{max}(E_{max} - E_{mid}) - E_{min}(E_{mid} - E_{min})\}} \quad (9)$$

the connecting time of sections 6
$$= \frac{2E_{max} T_s (V_{mid} - V_{min})}{2\{E_{max}(E_{max} - E_{mid}) - E_{min}(E_{mid} - E_{min})\}} \quad (10)$$

Ts: repeating time of sections 1 to 11
Vmax: maximum value of output phase voltage command
Vmid: intermediate value of output phase voltage command
Vmin: minimum value of output phase voltage command
Emax: maximum value of input voltage
Emid: intermediate value of input voltage
Emin: minimum value of input voltage.

\* \* \* \* \*